US006253169B1

(12) United States Patent
Apte et al.

(10) Patent No.: US 6,253,169 B1
(45) Date of Patent: Jun. 26, 2001

(54) METHOD FOR IMPROVEMENT ACCURACY OF DECISION TREE BASED TEXT CATEGORIZATION

(75) Inventors: Chidanand Apte, Chappaqua; Frederick J. Damerau, North Salem, both of NY (US); Sholom M. Weiss, Highland Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/084,985

(22) Filed: May 28, 1998

(51) Int. Cl.[7] .............................. G06E 17/27; G06E 21/00
(52) U.S. Cl. ................................................ 704/9; 707/531
(58) Field of Search ..................... 701/1, 9, 10; 707/530, 707/531, 532, 102

(56) References Cited

U.S. PATENT DOCUMENTS

| | | | | |
|---|---|---|---|---|
| 5,182,708 | * | 1/1993 | Ejiri ........................................ | 704/9 |
| 5,317,507 | * | 5/1994 | Gallant .................................... | 704/9 |
| 5,371,807 | * | 12/1994 | Register et al. ......................... | 704/9 |
| 5,463,773 | * | 10/1995 | Sakakibara et al. ..................... | 704/9 |
| 5,526,443 | * | 6/1996 | Nakayama ........................... | 382/229 |
| 5,619,709 | * | 4/1997 | Caid et al. .............................. | 704/9 |
| 5,659,766 | * | 8/1997 | Daund et al. ........................... | 704/1 |
| 5,675,710 | * | 10/1997 | Lewis ..................................... | 704/1 |
| 5,675,819 | * | 10/1997 | Schuetze ................................. | 704/9 |
| 5,687,364 | * | 11/1997 | Saund et al. ............................ | 704/1 |
| 5,732,260 | * | 3/1998 | Nomiyama .............................. | 704/9 |
| 5,794,178 | * | 8/1998 | Caid et al. .............................. | 704/9 |
| 5,819,259 | * | 10/1998 | Duke-Moran et al. ................. | 707/3 |
| 5,963,205 | * | 10/1999 | Sotomayor .......................... | 345/333 |
| 5,969,442 | * | 9/1999 | Prasad .................................... | 707/2 |

OTHER PUBLICATIONS

C. Apte et al.; "Automated Learning of Decision Rules for Text Categorization"; IBM Research Report RC 18879; ACM Transactions on Information Systems; pp 1–20.
C. Apte et al; "Towards Language Independent Automated Learning of Text Categorization Models"; IBM Research Report RC 19481; In proceedings of ACM SIGIR '94.
S. Weiss et al.; "Predictive Data Mining—A Practical Guide"; Morgan Kaufmann Publishers, Inc.; 1998; pp. 135–199.

(List continued on next page.)

Primary Examiner—Forester W. Isen
Assistant Examiner—Patrick N. Edouard
(74) Attorney, Agent, or Firm—McGuireWoods, LLP; Stephen C. Kaufman, Esq.

(57) ABSTRACT

A text categorization method automatically classifies electronic documents by developing a single pooled dictionary of words for a sample set of documents, and then generating a decision tree model, based on the pooled dictionary, for classifying new documents. Adaptive resampling techniques are applied to improve the accuracy of the decision tree model.

18 Claims, 12 Drawing Sheets

OTHER PUBLICATIONS

I. Dagan et al; "Mistake–Driven Learning in Text Categorization"; Empirical Methods in NKP; Aug. 1997.

Y. Freund et al.; "Experiments with a New Boosting Algorithm"; AT&T Corp; 1996; pp. 148–156.

P. Hayes et al.; "Adding Value to Financial News by Computer"A1 on Wall Street; Oct. 1991; pp. 2–8.

P. Hayes et al.; "TCS: A Shell for Content–Based Text Categorization"; CH2842–3/90/0000/0320$01.00; IEEE; 1990; pp. 320–326.

T. Joachims; "Text Categorization with Support Vector Machines: Learning with Many Relevant Features"; Universitat Dortmund, Dortmund, Germany; pp. 1–15.

D. Lewis; "Feature Selection and Feature Extraction for Text Categorization"; University of Chicago; pp. 212–217.

Y. Yang; "An Evaluation of Statistical Approaches to Text Categorization"; Carnegie Mellon University; Apr. 1997; pp. 1–10.

Y. Yang (Carnegie Mellon University) and Jan Pedersen (Verity, Inc); "A Comparative Study on Feature Selection in Text Categorization".

Apte et al ., "Data Mining with Decision Trees and Decision rules", Future Generation Computer Systems, Nov. 1997, pp. 1–13.*

* cited by examiner

FIG.10

| PREDICTION METHOD | PERFORMANCE BREAKEVEN (%) |
|---|---|
| NAIVE BAYES(LINEAR) | 73.4 |
| ROCCHIO(LINEAR) | 78.7 |
| DECISION TREE C4.5 | 78.9 |
| k-NEAREST NEIGHBOR | 82.0 |
| OPTIMIZED RULE INDUCTION | 82.0 |
| SUPPORT VECTOR (rbf) | 86.3 |

FIG.11

| NUMBER OF TREES | WORDS-TRAIN | WORDS-APPLY | MEAN TREE SIZE | BREAKEVEN (%) |
|---|---|---|---|---|
| 10 | 2133 | 1156 | 14.6 | 85.9 |
| 25 | 2133 | 1453 | | 87 |
| 50 | 2133 | 1553 | 17.2 | 87.7 |
| 100 | 2133 | 1667 | 17.2 | 87.8 |
| 50 | 3878 | 2276 | 16.7 | 87.7 |
| 50 | 7595 | 2799 | 15.9 | 87.1 |

METHOD FOR IMPROVEMENT ACCURACY OF DECISION TREE BASED TEXT CATEGORIZATION

BACKGROUND OF THE INVENTION

1. Field of the Invention

This invention generally relates to information storage and retrieval, and more particularly to a method for classifying information in a database using a dictionary and a decision tree model.

2. Description of the Related Art

Advances in computer database technology allow enormous amounts of information to be stored at one location. For all the problems this technology has solved in terms of convenience, it has also created a number of problems, specifically in the area of database information management.

A database is of no use if, when searched, relevant information cannot be retrieved from it. Increases in database capacity, therefore, have necessitated the development of companion technology for the efficient management of database information. Various text mining approaches have been developed for this purpose, one of which is known as text categorization.

Early text categorization systems were human-engineered knowledge-based systems. Because these systems require manual analysis in order to create a set of rules for classifying database information, they have proved to be impractical especially when applied to databases of large information. One such system is disclosed in Hayes et al., *Adding Value to Financial News by Computer*, Proceedings of the First International Conference on Artificial Intelligence Applications on Wall Street, pages 2–8, 1991. See also Hayes et al., TCS: *A Shell for Content-Based Text Categorization*, Proceedings of the Sixth IEEE CAIA, pages 320–326, 1990.

Automated text categorization methods represent a substantial improvement over their manual counterparts. Typically, these system use a computer-generated dictionary to form a set of rules for classifying database information. This dictionary is created by extracting patterns from a sample (or training) set of data, which often takes the form of a collection of electronic documents or other descriptive materials.

More specifically, in forming a dictionary, documents in the sample set are transformed into a standard model of features and classes. This is usually performed by encoding the documents in numerical form, which requires a transformation of text to numbers. A uniform set of measurements, or features, is then taken for each document. These features are used to create a dictionary, specifically by checking each document for the presence or absence of specific words or by determining a frequency of occurrence (i.e., count) of such words. These words are then associated with a number of known topics selected, for example, based on subject matter disclosed in the documents. Generalized rules are then formed from these dictionaries, which rules are then used to classify new documents to be added to the database.

Other methods use feature selection techniques to select a small subset of words that are deemed relevant to a particular topic. For example, the Reuters 21578 collection of newswire articles has for the year 1987 about 10,000 stemmed words. If feature selection is employed for a given topic, a much smaller subset of words (e.g., a couple of dozen words) may be formed for the topic. Feature selection methods of this type are disclosed in Yang, *An Evaluation of Statistical Approaches to Text Categorization*, Technical Report CMU-CS-97-127, School of Computer Science CMU, 1997; and in Lewis, *Feature Selection and Feature Extraction for Text Categorization*, Proceedings of the Speech and Natural Language Workshop, pages 212–217, February 1992.

Dictionaries used to perform automated text categorization may be stemmed or unstemmed. The words in a stemmed dictionary are mapped to a common root, e.g., the word "cars" will be mapped to the root "car". No such mapping occurs for words in an unstemmed dictionary.

Dictionaries may also be universal or local. A universal dictionary is one consisting of, for example, all stemmed words in the complete collection of documents in a database. Universal dictionaries have been the most widely used type of dictionary for performing text categorization. They have, however, in many instances, proven to be inaccurate and thus undesirable for purposes of classifying documents, especially for methods which develop rules based on decision trees.

Once a dictionary of words has been developed, a model may be formed for classifying new documents to be added to the database. To improve the accuracy of conventional text categorization methods, decision trees have been employed. Use of decision trees, however, has been shown to have at least one significant drawback, namely these trees tend to overfit classifications to the documents in the sample set. Various techniques have been developed to limit overfitting, such as tree pruning, but empirical experimentation has shown the effectiveness of these techniques wane as the dictionary grows larger. Neural networks and so-called nearest-neighbor methods used to reduce the effects of overfitting have also proved less than satisfactory, particularly because of large computational costs.

Most recently, improvements have been made to text categorization systems which use universal dictionaries. For example, new training variations have emerged that can find a simple scoring solution with a large universal dictionary. See Dagan et al., *Mistake-Driven Learning in Text Categorization*, Proceedings of the Second Conference on Empirical Methods in Natural Language Processing, 1997. Nearest-neighbor methods have been applied with a universal dictionary and a variation that learns thresholds to classify multiple topics in parallel. See Yang, *A comparative Study on Feature Selection in Text Categorization*, Proceedings of the International Machine Learning Conference, 1997. And, a new method called support vectors has been developed which fits linear, polynomial or radial basis functions. See Joachims, *Text Categorization with Support Vector Machines: Learning with Many Relevant Features*, Technical Report, University of Dortmund, 1997.

While each of these improved methods have outperformed earlier text categorization methods to a degree, they, too, have a number of drawbacks, not the least of which is that they operate in very high dimensions at possibly huge computation expense. Further, many of them employ unusual optimization techniques to their training documents. Perhaps most significantly, however, like earlier-generation text classification methods, their effectiveness for purposes of classifying database information is substantially diminished by their use of universal dictionaries.

A need therefore exists for a text categorization method which classifies database information with greater accuracy and less computational cost, and further which does so without using a universal dictionary and by using a decision tree model which is substantially less susceptible to overfitting effects.

SUMMARY OF THE INVENTION

It is one object of the present invention to provide a computer-implemented text categorization method which classifies electronic documents in a database more efficiently and with greater accuracy than conventional methods.

It is another object of the present invention to achieve the foregoing object by developing a single pooled dictionary for a sample set of documents, which pooled dictionary is formed by combining local dictionaries separately developed for each of a plurality of topics disclosed in the documents.

It is another object of the present invention to provide a text categorization method which uses the pooled dictionary to form a decision tree model for classifying new documents to be added to the database.

It is another object of the present invention to use adaptive resampling techniques to enhance the accuracy of the decision tree model.

The foregoing and other objectives of the invention are achieved by providing a text categorization method which includes obtaining a collection of electronic documents, defining a sample set of documents from the collection, classifying the documents in the sample set, and then forming a prediction model for classifying new documents based on the manner in which documents in the sample set were classified. The classifying step itself has a number of steps, including analyzing words in the documents of the sample set to identify a plurality of topics, developing a plurality of local dictionaries each containing words descriptive of a respective one of the topics, and developing vectors for each of the documents in the sample set, with the vectors developed for each document being indicative of words in a respective one of the local dictionaries.

The step of forming a prediction model includes forming a plurality of decision trees, one or more for each of the topics. The decision trees are formed based on the vectors developed for the documents in the sample set for respective ones of the topics. Once formed, the prediction model may classify documents in one of several ways. If only one decision tree has been formed for each topic, the decision tree generates a classification outcome based on dictionary words found in the new document. The new document may then be classified based on one or more of those outcomes. If a plurality of decision trees are formed for each topic, through application of an adaptive resampling technique, the trees assigned to each topic generate a classification outcome based on the words in the new document. The outcomes are then voted and the new document is classified accordingly. In one practical application, the method of the present invention classified documents in the Reuters 21578 collection with greater accuracy than conventionally known methods.

BRIEF DESCRIPTION OF THE DRAWINGS

FIG. 10 is a table listing breakeven results obtained for standardized experiments performed for the Reuters 21578 collection.

FIG. 11 is a table summarizing results obtained by the present invention when applied to classifying documents in the Reuters 21578 collection.

DESCRIPTION OF THE PREFERRED EMBODIMENTS

The present invention is a method for categorizing information in a database. The information may be in the form of electronic documents or other textual or descriptive materials, or even e-mail. For the sake of clarity, the description herein is made with respect to the categorization of electronic documents, but this should not be limiting of the invention as one skilled in the art can appreciate that the present method may be used just as easily to categorize other types of information.

Figure 1:
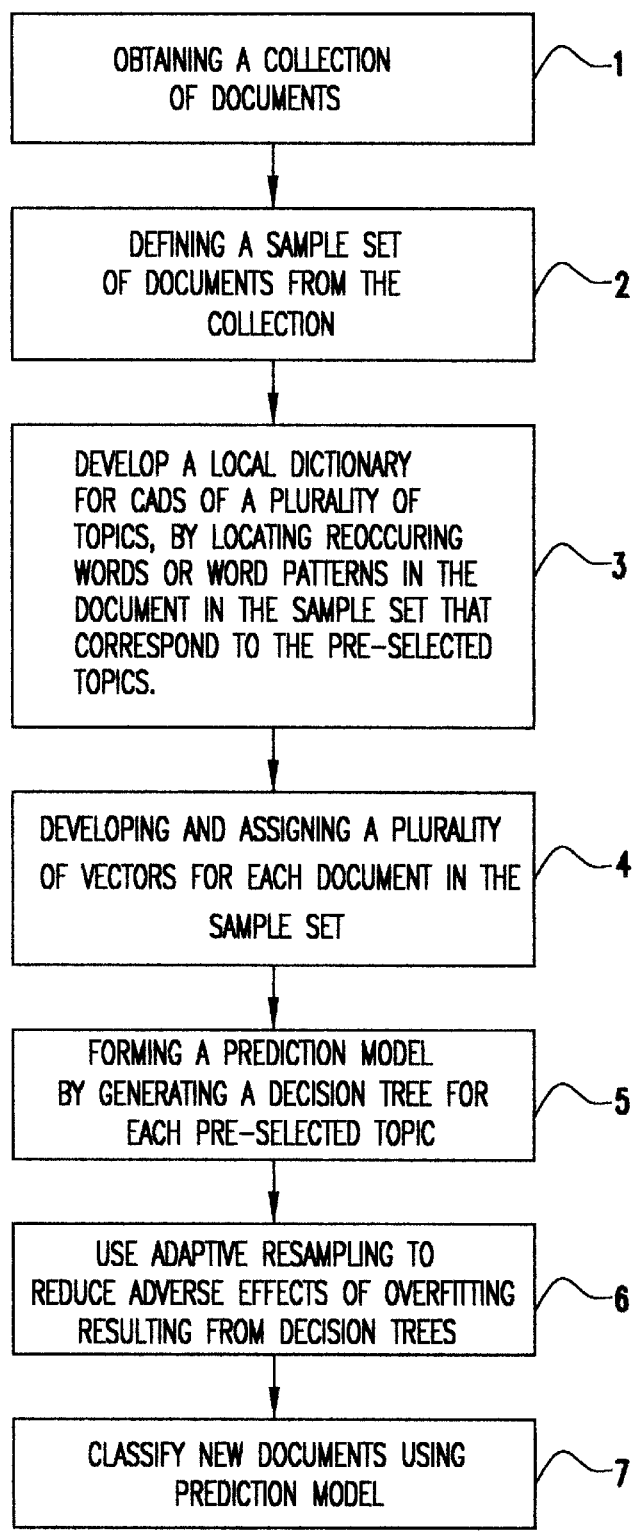
FIG. 1 is a flow diagram setting forth steps included in a first embodiment of the method of the present invention.

Referring to FIG. 1, a first embodiment of the method of the present invention begins by obtaining, or accessing, a collection of electronic documents in a database or other type of storage device. (Block 1).

In a second step, a sample (or training) set of documents is defined from the collection. (Block 2). The sample set of documents includes documents which have been manually reviewed and labeled based on their content. This label may be in the form of one or more pre-selected topics developed by humans for classifying documents. (As will be discussed in greater detail below, the method of the present invention uses this sample set to develop a learning model for automatically classifying documents as belonging to these pre-selected topics.) The sample set, further, may be as large or small as desired, but preferably it is of a size that will allow it to serve as an accurate representation, in terms of at least its substantive content, of all the documents in the collection.

In a third step, a local dictionary is developed for each of the pre-selected topics (Block 3). Each of the local dictionaries include words which are descriptive of or otherwise bear some relation to a respective one of the pre-selected topics. More specifically, the local dictionaries may be formed in accordance with a computer program which examines each document in the sample set to locate reoccurring words or word patterns that correspond to the pre-selected topics. Preferably, the local dictionaries are formed so that they contain only those words which most frequently appear in the documents of the sample set. If desired, any one or more of the dictionaries may be limited to include only a maximum number of words, and the words in the local dictionaries may be stemmed or unstemmed.

Local dictionaries of a type which may be formed in accordance with the third step are discussed in detail in Apte et al., *Automated Learning of Decision Rules for Text Categorization*, ACM Transactions on Information Systems, 12(3):233–251, July 1994. This type of dictionary has been determined to be preferable for the present invention, which employs decision trees, because they eliminate the need to perform complex feature selection.

In a fourth step, a plurality of vectors are developed and assigned to each document in the sample set. (Block 4). The vectors assigned to each document provide an indication of words appearing in the document which are included in respective ones of the local dictionaries developed for the pre-selected topics. Each vector may be developed so as to be indicative of merely the presence or absence of these dictionary words, or the vectors may provide more detailed information such as the frequency of occurrence of words from the dictionaries that appear in the document. This latter type of vector may, for example, be developed to indicate that one of the documents in the sample set discloses a word from one of the dictionaries three times. Once vectors for all the documents in the sample set have been generated and assigned, the next step of the method is performed.

In the next, or fifth, step, a decision tree for each pre-selected topic is formed based on the plurality of local dictionaries developed in the third step. (Block 5). This may be performed by logically relating the vectors developed for each document for a particular topic. For example, if there are three documents in the sample set, vectors assigned to these documents for a Topic #1 will be used to develop a decision tree for Topic #1.

Preferably, the decision trees are formed in accordance with a computer program employing one or more of the techniques disclosed in Apte et al., *Data Mining with Decision Trees and Decision Rules*, Future Generation Computer Systems, 13:197–210, 1997. Those skilled in the art can appreciate, however, that other techniques may be used to generate the decision trees of the present invention.

Once formed, the decision trees serve as a prediction model for classifying documents in the collection not included in the sample set, or new documents to be added to the collection. (Block 7). The decision trees may be constructed, for example, using binary trees or multi-way trees. A binary tree is one in which every node therein has exactly two subtrees, and a multi-way node is one in which every node therein can have two or more subtrees.

Further, the decision trees developed may be binary classifiers, where the k most frequent words for a topic are used for each binary classification of a "topic" vs. "not-the-topic". More specifically, the trees may be generated separately from the individual documents in the sample set by forming a covering tree with true-or-false rules that partition the documents into groups for a topic and groups for not-the-topic. (Herein, the phrase "binary classification" refers to a tree that reaches a binary decision of "topic" or "not-the-topic.")

Figure 14:
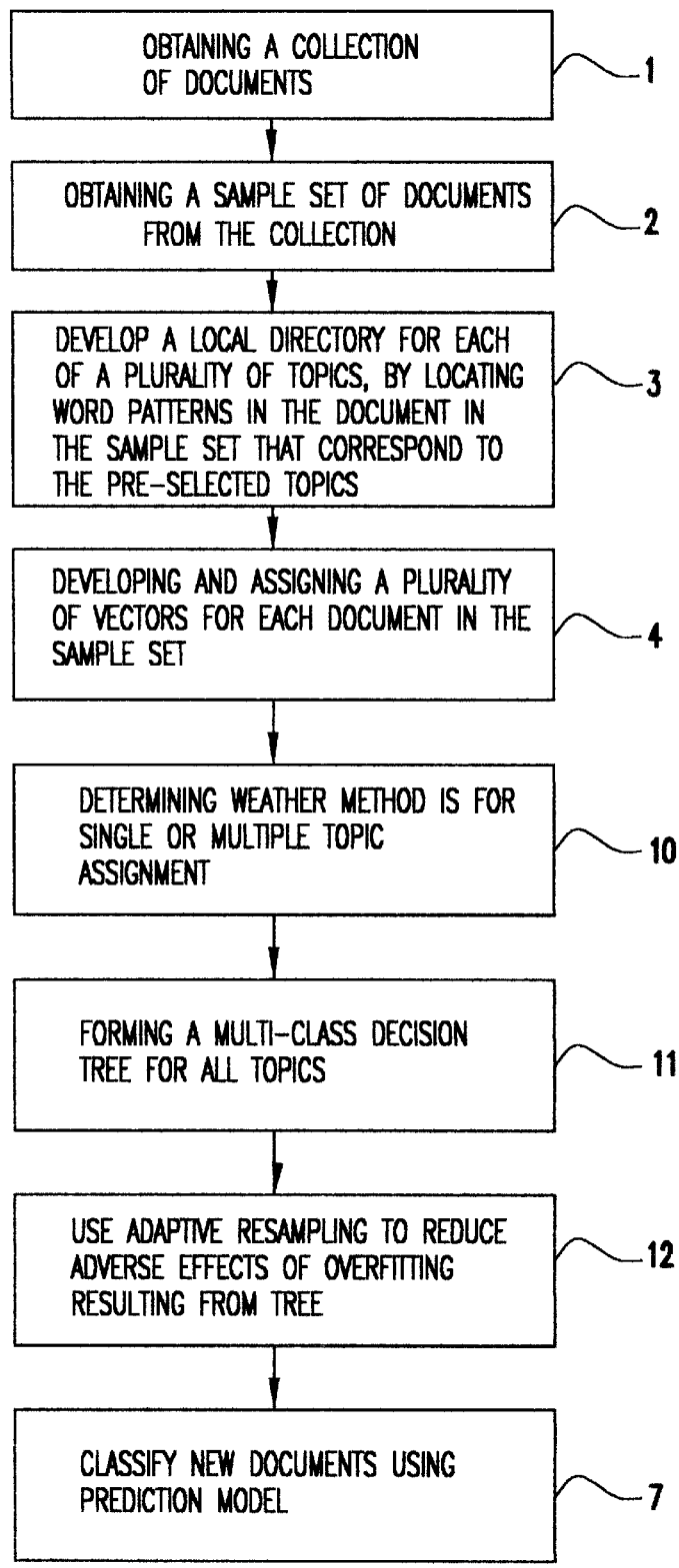
FIG. 14 is a flow diagram showing steps included in another embodiment of the method of the present invention.

According to another aspect, as shown in FIG. 14, in an initial step, it may be determined whether the present method is intended to be used so that it assigns only one topic to a document in or to be added to the collection (i.e., single-topic assignment) or so that it assigns multiple topics to such a document (i.e., multiple-topic assignment). (Block 10). This intention may be indicated, for example, by a designer or user in the software implementing the method. When it is known in advance that the method is intended for single-topic assignment, a multi-class decision tree can be developed instead of binary trees. (Block 11). With a multi-class tree, all topics are classified by a single tree, rather than using k binary trees, where k is the number of topics. Both types of decision trees may be readily developed using well-known automated learning techniques. Adaptive sampling techniques may then be used to enhance the performance of the multi-class tree (Block 12). (All other blocks in FIG. 14 are analogous to those in FIG. 1 and thus have been similarly numbered.)

During application, it is possible that the decision tree, or trees, developed in accordance with the present invention are less than optimal because of overfitting effects, i.e., because the trees are too specialized to the sample set of documents. As a result, in at least certain instances, the decision trees may erroneously classify documents, i.e., classify a document that belongs to a topic as "not-the-topic," and vice versa. To overcome the adverse effects of overfitting, adaptive resampling techniques may be used as an optional step of the present method to reduce the classification errors produced by the decision trees developed for each topic. (Block 6).

Adaptive resampling techniques require the development of multiple decision trees for each topic in order to reduce overfitting effects and thus to improve the overall accuracy of the decision-tree model. In one adaptive resampling technique, instead of taking random samples from the entire collection of documents, so that each document in the collection has a 1/n chance of being included the sample, an incremental approach is taken. Here, the objective is to increase the odds of selecting documents erroneously classified by trees that have already been induced. This technique approach is described, for example, in Freund et al., Experiments with a New Boosting Algorithm, Proceedings of the International Machine Learning Conference, pages 148–156, Morgan Kaufmann, 1996. An illustrative application of this technique will now be provided.

Figure 2:
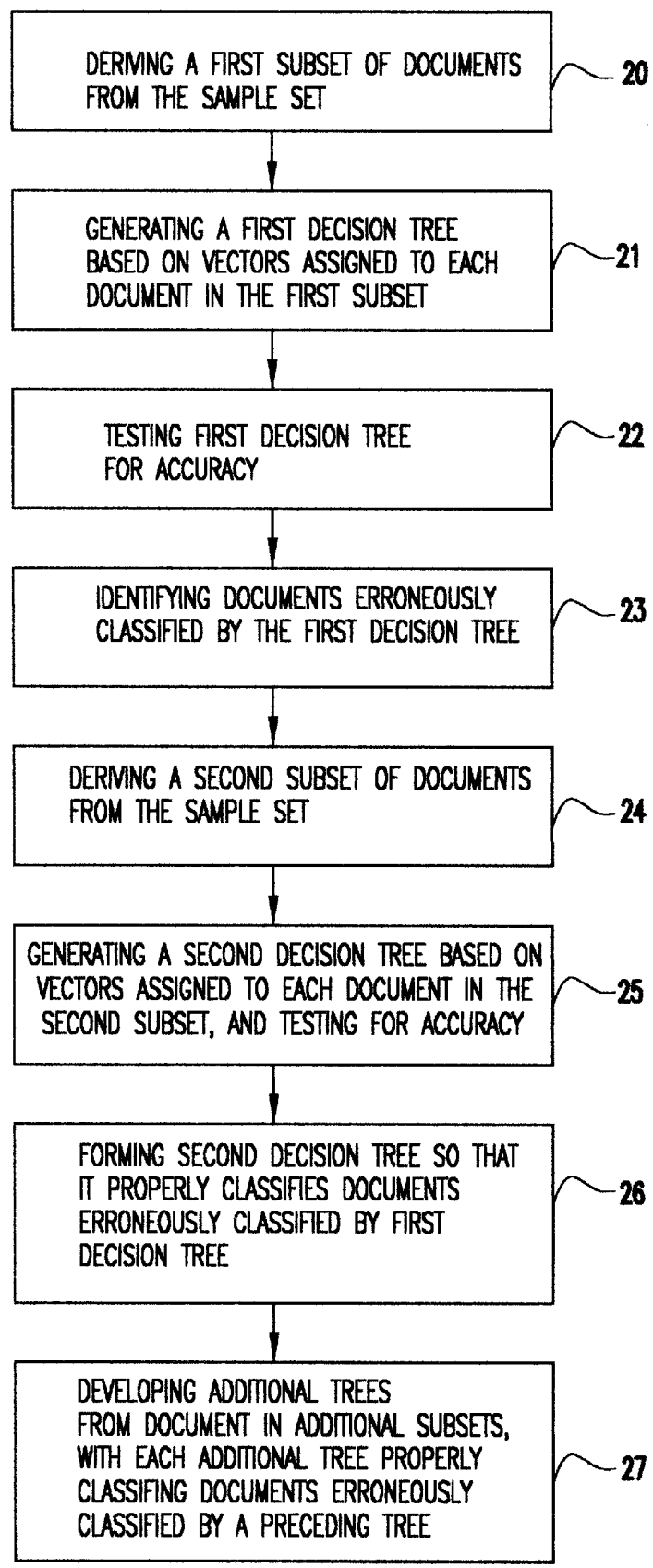
FIG. 2 is a flow diagram setting forth steps included in one adaptive resampling technique which may be applied to develop decision trees in accordance with the first embodiment of the method of the present invention.

Referring to FIG. 2, for a given topic, a first decision tree is generated based on the vectors assigned to each document in a first subset of documents for a particular topic, with the first subset being derived from the sample set of documents. (Blocks 20 and 21). The first decision tree is then tested on the complete sample to determine how accurately it classifies documents. (Block 22). This is performed, for example, by comparing the topic which the first decision tree assigned to the documents in the first subset with the topic human reviewers manually assigned to these documents. A proper classification, of course, will result in the documents being assigned the topic for which the first decision tree was generated, i.e., the given topic noted above. It is expected, however, that a certain percentage of documents in the complete sample will be erroneously classified by the first decision tree (return a result of "not-the-topic"). These erroneously classified documents are then identified (Block 23).

Next, a second decision tree is formed for the given topic and then tested for accuracy. (Block 25). Similar to the first decision tree, the second decision tree is formed based on vectors assigned to the documents in a second subset for the given topic. (Block 24). The second subset is also taken from the sample set of documents, and some documents in the second subset may overlap those in the first subset. The second decision tree may further be formed in such a manner as to properly classify the documents which were erroneously classified by the first decision tree. (Block 26). This is accomplished, for example, by using any one of a number of conventional tree induction programs. By correcting the errors of the first decision tree, the second decision tree is regarded as being more accurate than the first decision tree for purposes of classifying the documents erroneously classified by the first decision. tree.

If desired, additional trees may be developed for the same topic and, if desired, for additional topics through an analogous application of steps, with each additional tree properly classifying documents erroneously classified by a preceding tree. (Block 27). The method of the present invention, thus, may be said to be adaptive in nature, as the second and subsequent trees formed "learn" from the mistakes of preceding trees. At the conclusion of the adaptive resampling step, multiple decision trees will have been developed for one or more of the pre-selected topics.

Trial and error techniques may be used to determine what number of trees for each topic is optimal. For example, the general rule obtains that the more trees, the better the predictive performance of the model. However, trials show that performance gains decrease markedly with larger numbers of trees. So typically, a maximum number of trees (e.g., 100 trees) may initially be set. Performance may then be compared with fewer numbers of trees, and a human can perform a cost/benefit analysis to determine whether the performance results obtained with fewer numbers of trees outweighs the complexity introduced by using larger numbers of trees.

Figure 3:
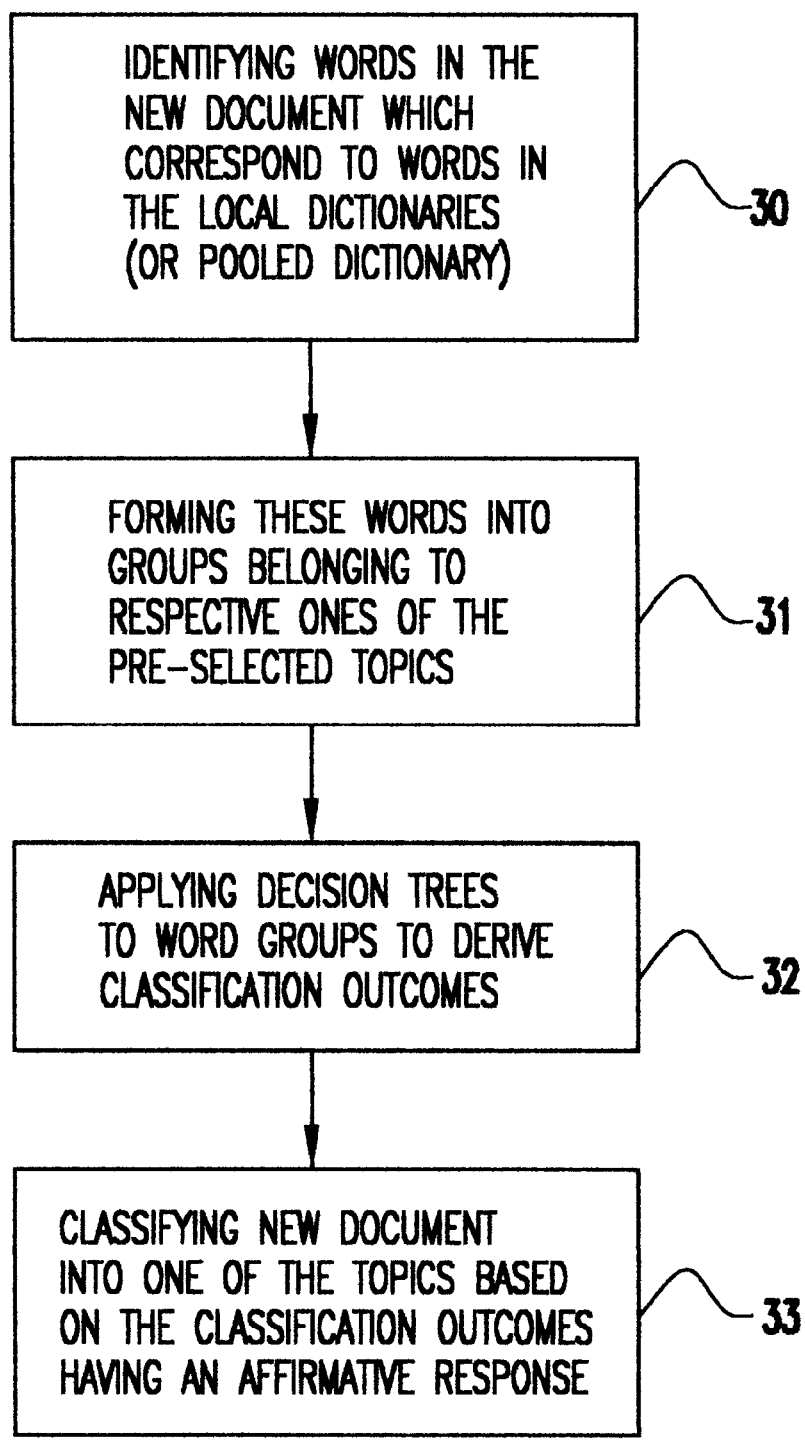
FIG. 3 is a flow diagram setting forth steps on how multiple decision trees generated in accordance with the first embodiment of the invention classify a new document.

How the multiple decision trees classify a new document (Block 7) depends upon the number of trees generated for each topic. Referring to FIG. 3, if only one tree has been generated for each of the pre-selected topics, the step of classifying a new document begins by identifying words in the new document which correspond to words in the local dictionaries (or a single pooled dictionary, to be discussed below). (Block 30). These words are then formed into groups belonging to respective ones of the pre-selected topics. (Block 31). The decision trees are then applied to the groups to derive classification outcomes, with each of the classification outcomes being generated by applying one of the trees to a respective one of the groups relative to one of the pre-selected topics. (Block 32).

Finally, the new document is classified as belonging to at least one of the topics based on the classification outcomes, (Block 33). Therefore, the new document may be classified based on one or more of the classification outcomes indicating an affirmative response of "topic."(Block 34). (A negative response would be an outcome of "not-the-topic"). A computer program may be used to determine whether the new document is classified as belonging to more than one topic, or just one topic.

Figure 4:
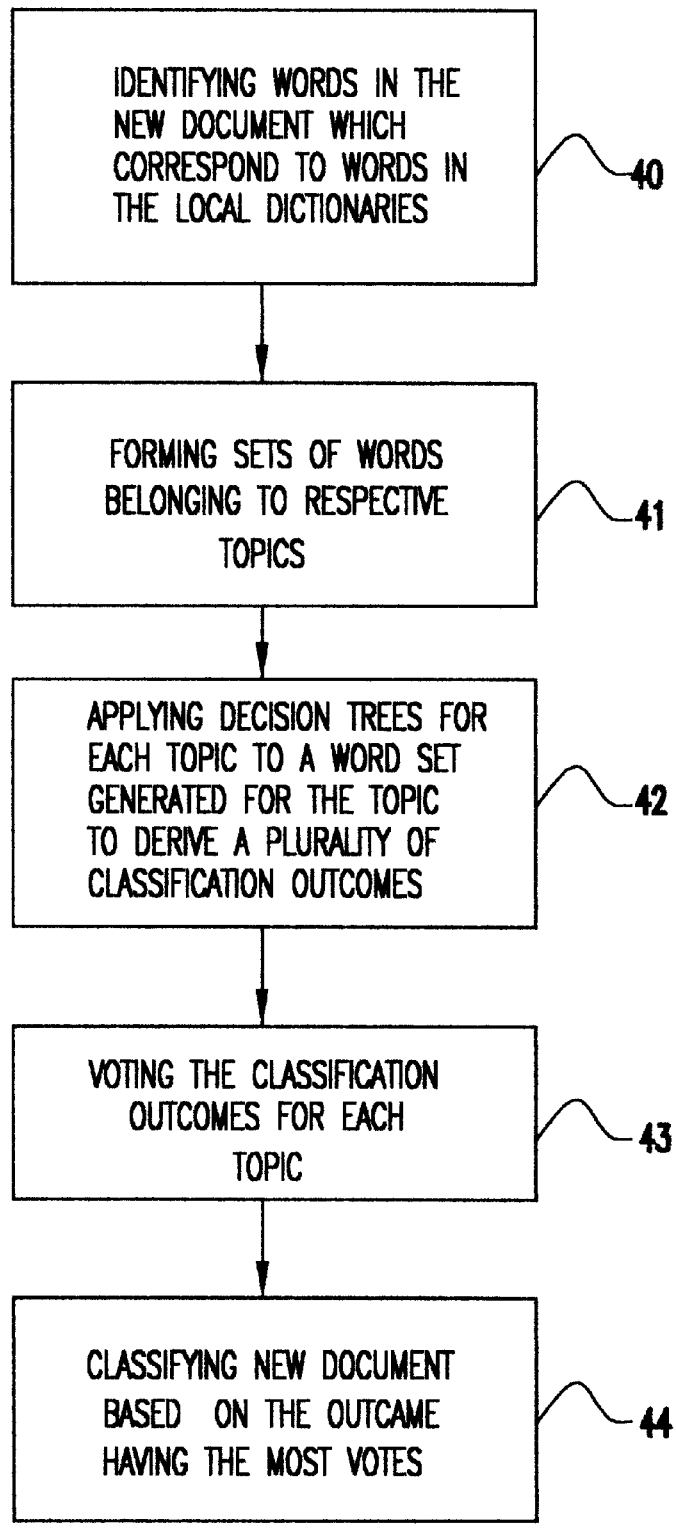
FIG. 4 is a flow diagram setting forth steps on another way in which multiple decision trees generated in accordance with the first embodiment of the invention classify a new document.

If a plurality of trees are generated for each topic, i.e., if adaptive resampling techniques have been used to enhance the performance of trees in the prediction model, a voting scheme may be used to classify the new documents. More specifically, referring to FIG. 4, in a first step, words in the new document are identified which correspond to words in the local dictionaries (or single pooled dictionary). (Block 40). These words are then formed into sets of words belonging to respective ones of the pre-selected topics. (Block 41). The plurality of decision trees generated for each topic are then applied to a respective set of words to thereby generate a plurality of classification outcomes, one from each decision tree. (Block 42). The classification outcomes generated by each tree for a topic are then voted, for example, by a simple majority vote (Block 43), and the new document is classified based on the outcome (e.g., "topic" or "not-the-topic") having the most votes (Block 44).

Figure 5:
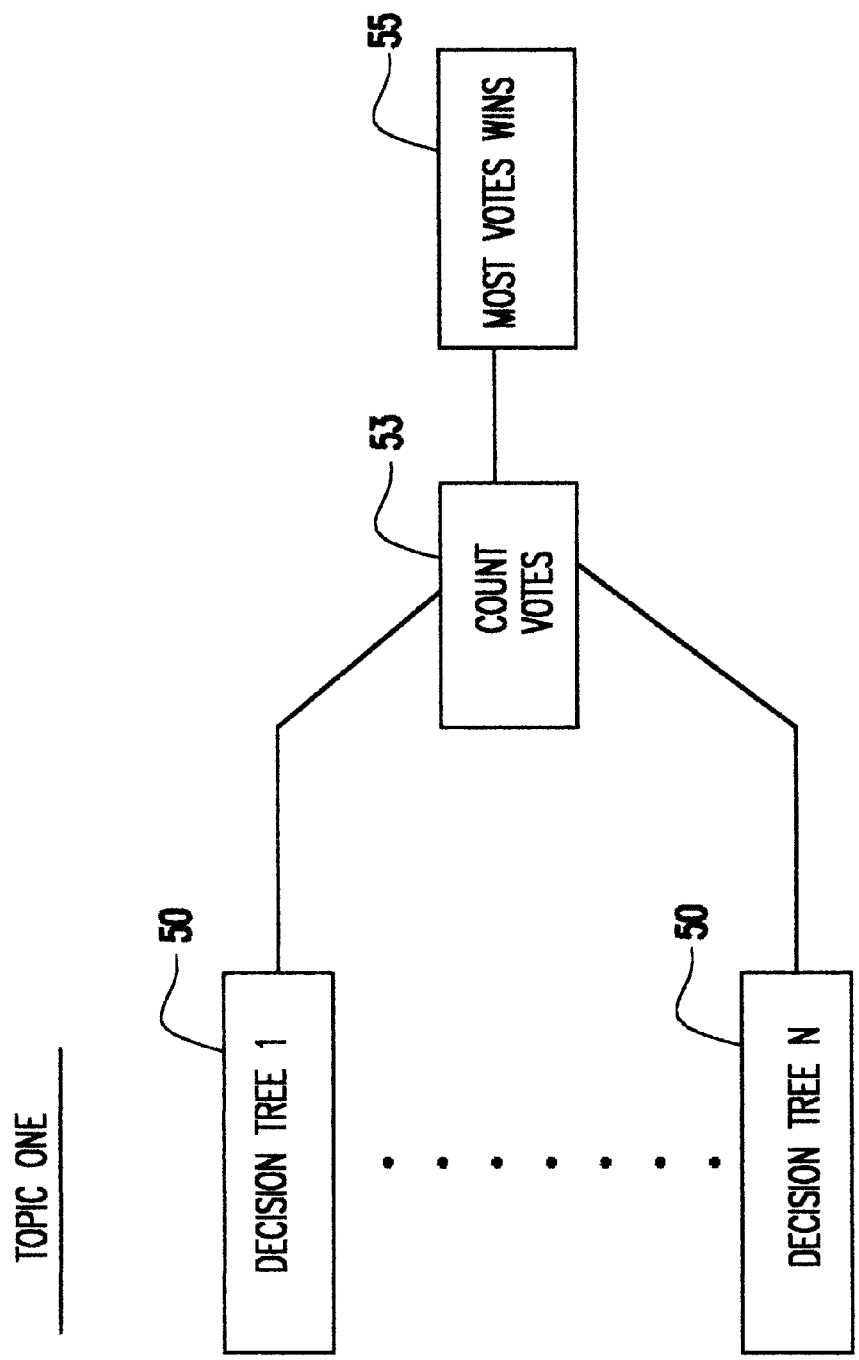
FIG. 5 is a conceptual diagram showing a voting scheme implemented by the first embodiment of the method of the present invention.

This voting scheme may be further exemplified with reference to FIG. 5, in which each of N multiple trees (Block 50) developed for a topic is given one vote and the votes are counted (Block 53). A new document to be added to the collection is then classified by picking the classification with the most votes. (Block 55). For example, if ten binary decision trees are developed for a topic, six of the trees may classify the new document in "class 1," while four of the trees may classify the new document in "not class 1." The "class 1" classification wins, when a simple majority standard is applied, and thus the topic for "class 1" is assigned to the new document.

In practice, the Inventors discovered that as the number of decision trees developed for a topic increases, overfitting effects (or variance) produced by the decision trees gradually decreases, until a plateau is reached. Also, in practice, the Inventors determined that multiple trees produced a better classification result than could be achieved with a single tree, often far better. Ten trees were usually found to be sufficient.

Figure 9:
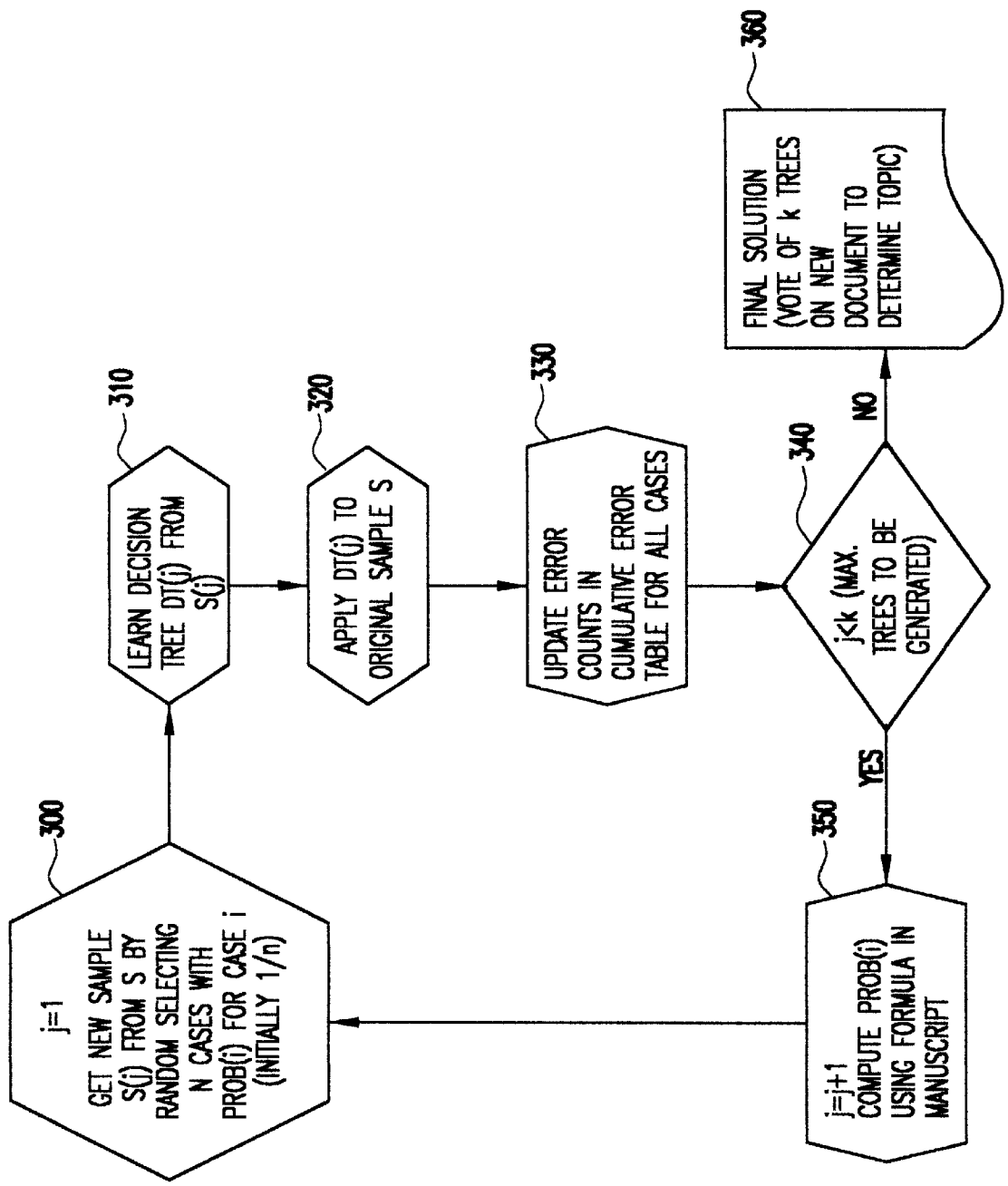
FIG. 9 is a flow diagram setting forth steps included in the application of adaptive resampling and voting performed-in accordance with the second embodiment of the present invention.

One adaptive resampling technique keeps a table of cumulative errors for each of the documents in the sample set when forming the prediction model. As an example, if three trees are developed for a particular topic, each tree may be applied independently and the cumulative errors are noted. If the cumulative number of errors for document 1 in the sample is 3, and the cumulative error for document 2 is zero, then a fourth tree may be developed for the topic with an emphasis towards properly classifying document 1. One skilled in the art can appreciate that any one or more of the trees developed for a topic may be formed in this manner. FIG. 9 discusses these aspects of the invention in further detail.

(Application of cumulative errors in the context of the present method may be further understood by realizing that at any stage of the learning process, numerous trees have been learned. Each tree may make errors on some cases because each tree sees only a random subset of the documents/cases and most trees do not generalize perfectly. Subsequent samples for use in inducing additional trees will heavily emphasize those cases that have the most errors when accumulated over all previous trees.)

The above-noted adaptive resampling approach may be performed, for example, in accordance with a function for increasing the weighting of error documents. For example, if e(i)is the cumulative error for document i and all independent trees, then a simple pseudo-probability function such as the following may be used to randomly sample document i with likelihood of pr(i).

$$pr(i) = (1 + e(k)^3) / \sum_j (1 + e(j)^3)$$

This approach is illustratively explained in Weiss et al., *Predictive Data Mining: A Practical Guide*, Morgan Kaufmann, 1998.

The aforementioned adaptive resampling techniques are advantageous when used in conjunction with decision trees, and thus is desirable for use in the context of the present invention, because decision tree algorithms are relatively efficient in high dimensions and because decision trees have a larger component of variance than other methods, like nearest-neighbor methods and neural networks.

Figure 6:
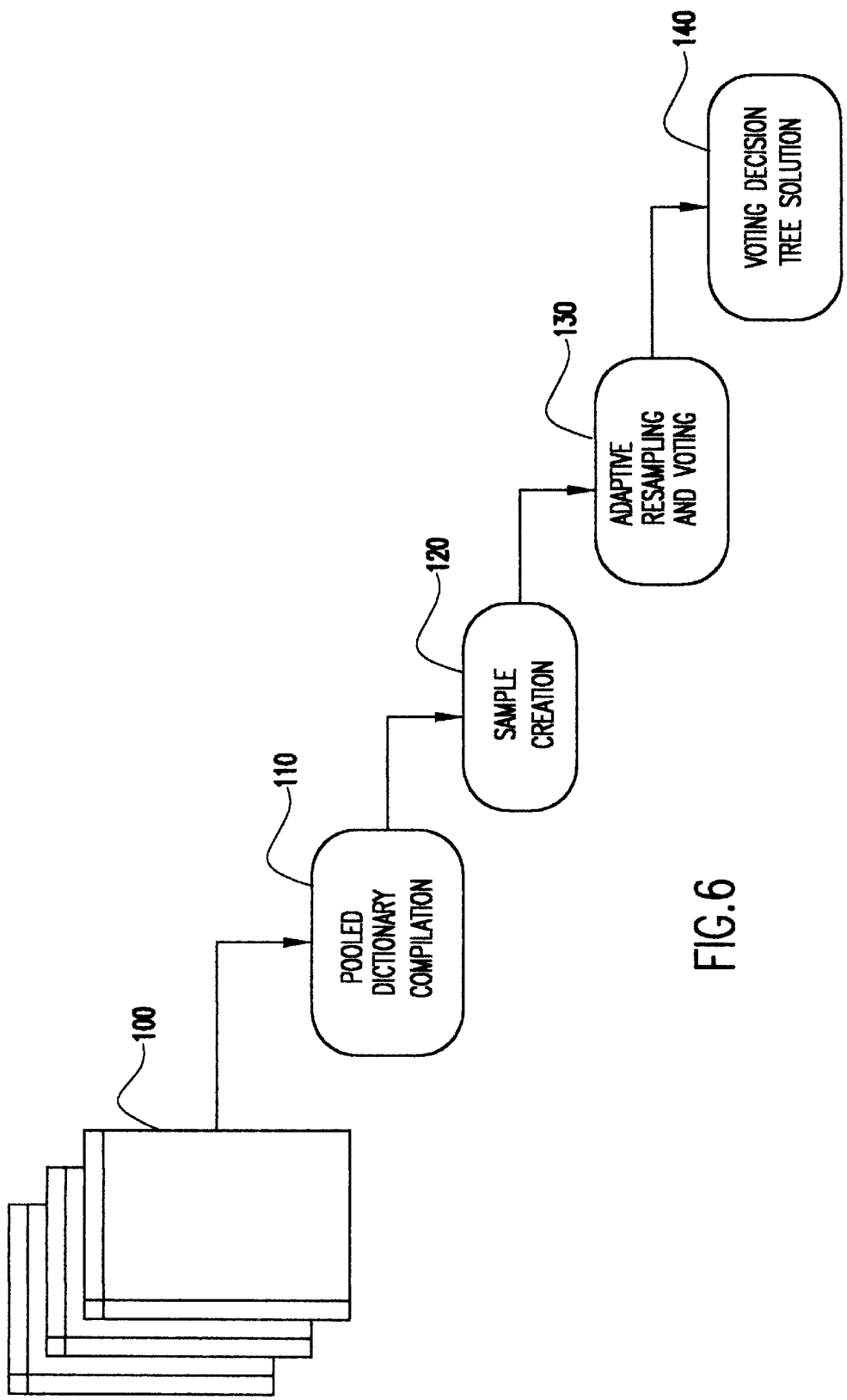
FIG. 6 is a flow diagram setting forth steps included in a second embodiment of the method of the present invention.

Referring to FIG. 6, a second embodiment of the method of the present invention includes compiling a pooled dictionary 110 from a collection of text documents 100, creating a sample 120, developing multiple decision trees for each topic by performing adaptive resampling and voting techniques 130, and then forming a prediction model in the form of a voting decision tree solution 140.

A pooled dictionary is formed by developing a number of local dictionaries of size k for each topic, and then combining, or pooling, these dictionaries into one dictionary. If k is large enough, the pooled dictionary may be the same or equivalent to the type of universal dictionary used by conventional text categorization methods. If, however, k is relatively small, the pooled dictionary is substantially smaller than any such universal dictionary, thus giving the method of the present invention an advantage over conventional text categorization methods employing universal dictionaries. Also, with a relatively small k, an unstemmed dictionary may be used.

Figure 7:
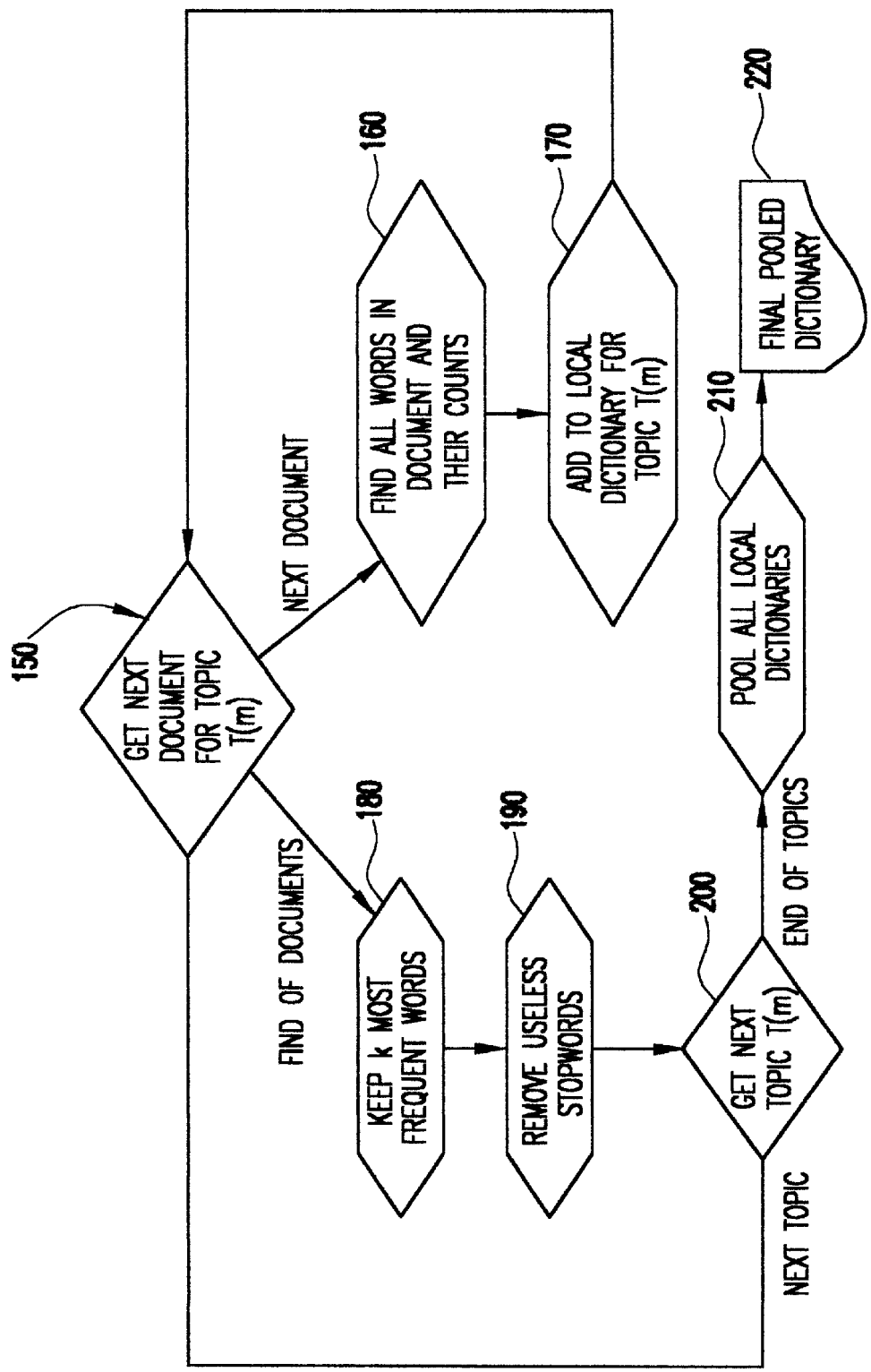
FIG. 7 is a flow diagram setting forth setting forth steps of how a pooled dictionary is formed in accordance with the present invention.

FIG. 7 is a flow diagram showing how the pooled dictionary of the present invention is compiled. In block 150, a document from a sample (or training) set of documents is retrieved for a particular topic T(m). All words in the document are then identified and counted (Block 160), for example, in accordance with a computer program. One or more of the words from this document are then added to a local dictionary being developed for topic T(m) (Block 170). If all documents in the sample set have not been examined, the foregoing steps are repeated until all documents in the sample set have been considered.

At this time, a decision is made to keep in the local dictionary developed for topic T(m) only the k words which most frequently appeared in the documents examined. (Block 180). Stopwords are then removed from the local dictionary (Block 190), after which the local dictionary for topic T(m) may be considered to be fully formed. In Block 200, control is returned to Block 150 so that a local dictionary for the next topic (e.g., T(m+1)) may be developed in accordance with steps analogous to those mentioned above. When the local dictionaries for all the topics have been formed, they are then combined (Block 210) until the final pooled dictionary is formed (Block 220). This may be accomplished, for example, by putting the words in all the dictionaries together into one dictionary, in sorted fashion and with duplicate words removed.

Figure 8:
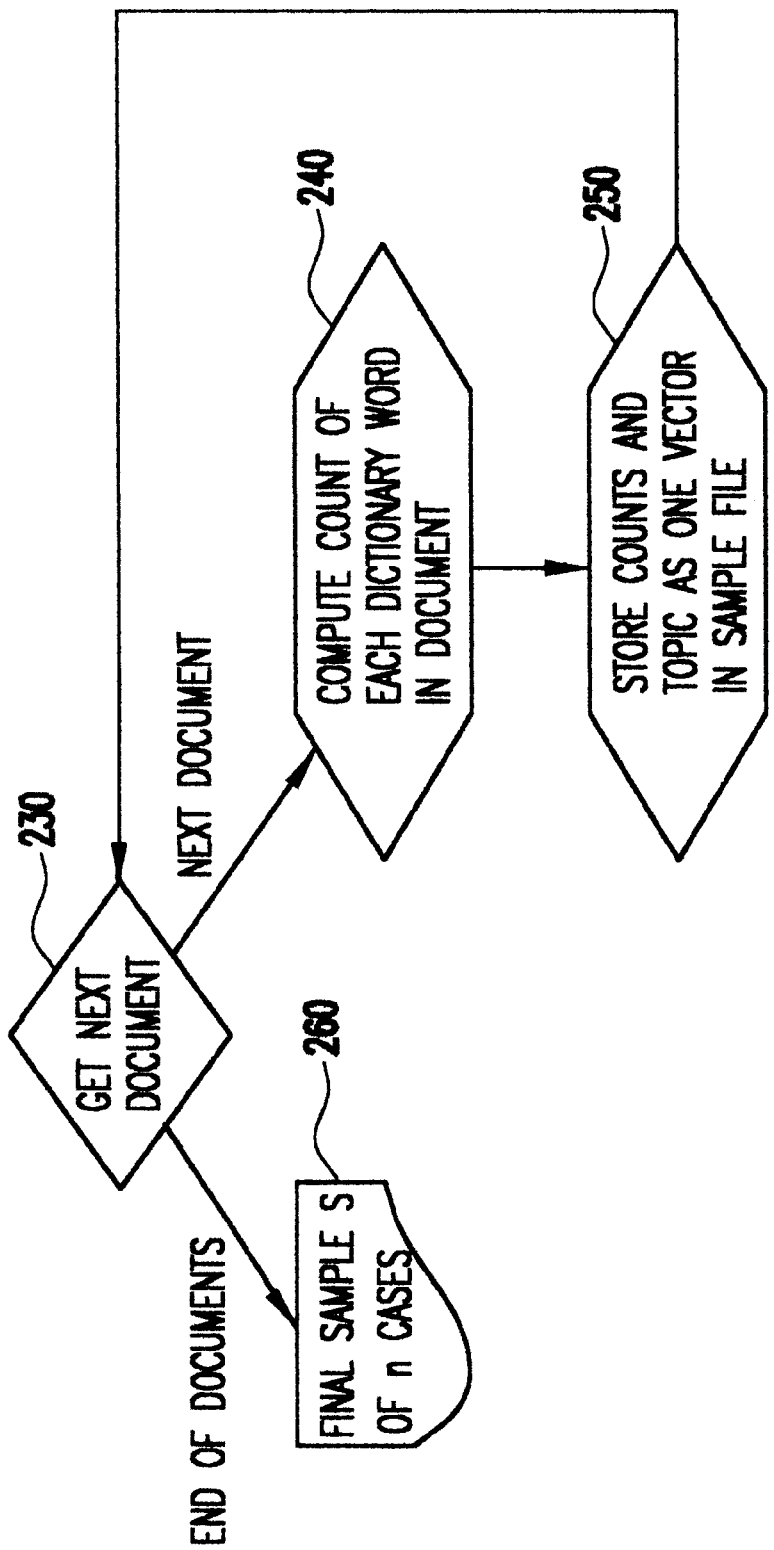
FIG. 8 is a flow diagram setting forth steps included in the creation of a sample in accordance with a second embodiment of the present invention.

FIG. 8 shows the steps included in the sample creation step. The sample creation step involves generating vector information for each document in the sample set. Specifically, a document is retrieved from the sample set (Block 230) and counts are computed for the words in the pooled dictionary that appear in the document (Block 240). These words counts and the topics they belong to are then stored as one vector in a sample file of the database or other storage device. (Block 250). These steps are then repeated for each document in the sample set until sample files have been developed for each document in the sample set. These files are then combined for form a final sample file S of n cases. (Block 260).

FIG. 9 shows the steps included in the adaptive resampling and voting step. In Block 300, a new sample S(j), with j initially equaling 1, is retrieved from the sample set of documents, by randomly selecting N cases with a probability (i) for case i (initially 1n). A decision tree DT(j), learned from sample file S(j) (Block 310), is then applied to the original sample S (Block 320), and an update of error counts in a cumulative error table is performed for all cases (Block 330). The decision trees DT(j) for samples S(j) may be sequentially developed, or may be developed simultaneously.

(For purposes of clarity, it is noted that S is the full sample of all documents to be used for training, and S(j) is the sample that is used to learn the $j^{th}$ tree. This latter term, further, is a random sample drawn from S, and it is the same size as S but some of the cases (documents) in S(j) are repeated and some documents in S do not appear in S(j). Samples S(j) therefore may be deemed to be subsets of sample S.)

In the next step, it is determined whether j is less than k, which is number corresponding to a maximum number of trees to be generated. (Block 340). If j is less than k, probability prob (i) is computed, j is incremented by 1 (Block 350), and the steps in Blocks 310–340 are repeated for a new sample. When j=k during this iterative process, a final solution is obtained, which is formed of k independent trees which are not merged. The final solution serves as a model for classifying, by voting the k trees developed, a new document into one of the pre-selected topics. (Block 360).

EXAMPLE

The method of the present invention was used to categorize the Reuters 21578 collection of newswires for the year 1987. The Reuters 21578 collection is a standardized collection of electronic articles which has served as a benchmark for gauging the performance of a known text categorization methods. As the empirical results set forth below clearly show, when applied to the Reuters collection, the text categorization method of the present invention produced superior results, surpassing the text categorization results achieved by all previously known text categorization methods.

The present method achieved this superior performance by developing a number of relatively small local dictionaries for only those topics in the Reuters collection having two or more documents linked to it from the sample set. Local dictionaries were created using the procedure described in Apte et al., Automated Learning of Decision Rules for Text Categorization, ACM Transactions on Information Systems, 12(3):233–251, July 1994. The local dictionaries were then combined to form a single pooled dictionary.

A decision-tree-based prediction model was then created for classifying the articles in the Reuters collection. In so doing, data was presented to learning programs, i.e., decision tree procedures, consisting solely of unnormalized frequency counts. Words occurring in a headline were given one extra count. In one additional experiment, a universal dictionary was generated for all stemmed words within a global frequency greater than four.

To achieve even better performance, adaptive resampling techniques were used to generate the decision trees. (Variation of the Reuters benchmark corresponded to the Mod-Apte organization with 9603 training documents and 3299 test documents.)

To understand how the present invention outperformed known text categorization methods, a number of prefatory comments are in order. First, it is noted that the standard evaluation criterion for the Reuters benchmark is the breakeven point, the point at which precision equals recall. Given a binary classification problem of topic vs. not-the-topic, recall is the ratio of correct-topic-cases/total-topiccases. (Here, the word case means document). Precision is correct-topic-cases/total-predicted-topic-cases. If the three individual components of these measures are summed over all topics, an overall measure of performance can be computed.

For the Reuters collection, recall is typically less than precision. Therefore, some artificial measure is needed to find a breakeven point. This measure must entail some global adjustment to the learning program, such as changing the threshold of decision for all topics to a value different than that for minimum error. FIG. 10 sets forth a table which lists the breakeven results of standardized experiments reported in the literature for the same collection. See Joachims, Text Categorization with Support Vector Machines: Leaning with Many Relevant Features, Technical Report, University of Dortmund, 1997.

The sole source of variation in the reported experimental results was the negligible effect of using slightly different criteria for the minimal number of cases to include a topic. Using complex optimization procedures and a universal dictionary, the support vector method emerges as the best performer of the conventional methods.

For all these conventional methods, selections were made among various parameters that were not necessarily obvious or stable. For example, the nearest neighbor results are for 30 neighbors. Results for other methods suggest that they may come within a percent or two to the performance of the support vectors, for example, a parallel nearest-neighbor method that uses local thresholds or an optimal linear least squares method with a universal dictionary. Here, too, the task requires the tuning of many parameters or very large resources.

Turning to the present invention, when adaptive resampling techniques were used to generate the decision trees for classifying documents in accordance with a voting scheme as previously disclosed, a relatively simple procedure was employed to find the breakeven point. For a binary classification application, a majority vote wins. To get a breakeven point, then, the number of votes needed to win was slightly altered. To illustrate, for 25 voting trees, the boundary is 13 to win. Instead, a boundary of 11 may be the point at which the global breakeven point is found. Using this procedure, an almost exact breakeven point can be found. If necessary, linear interpolation is used between the crossover number of votes, that moves from greater to lesser recall versus precision.

FIG. 11 sets forth a table which summarizes the results obtained by the present invention. In addition to the number of voted trees and their breakeven percentage, FIG. 11 summarizes the mean tree size and the number of words in the dictionary for training and applying the trees to new documents. Most of the experiments were performed with a dictionary of 2133 words, which constituted the pooled dictionary of the top 150 words for all topics. Once the top 150 words were found for a topic, stopwords were then removed. Also, the top 500 words for the unused topics were also found and entered into the 2133 word dictionary. This added about 50 new words to the dictionary.

Figure 12:
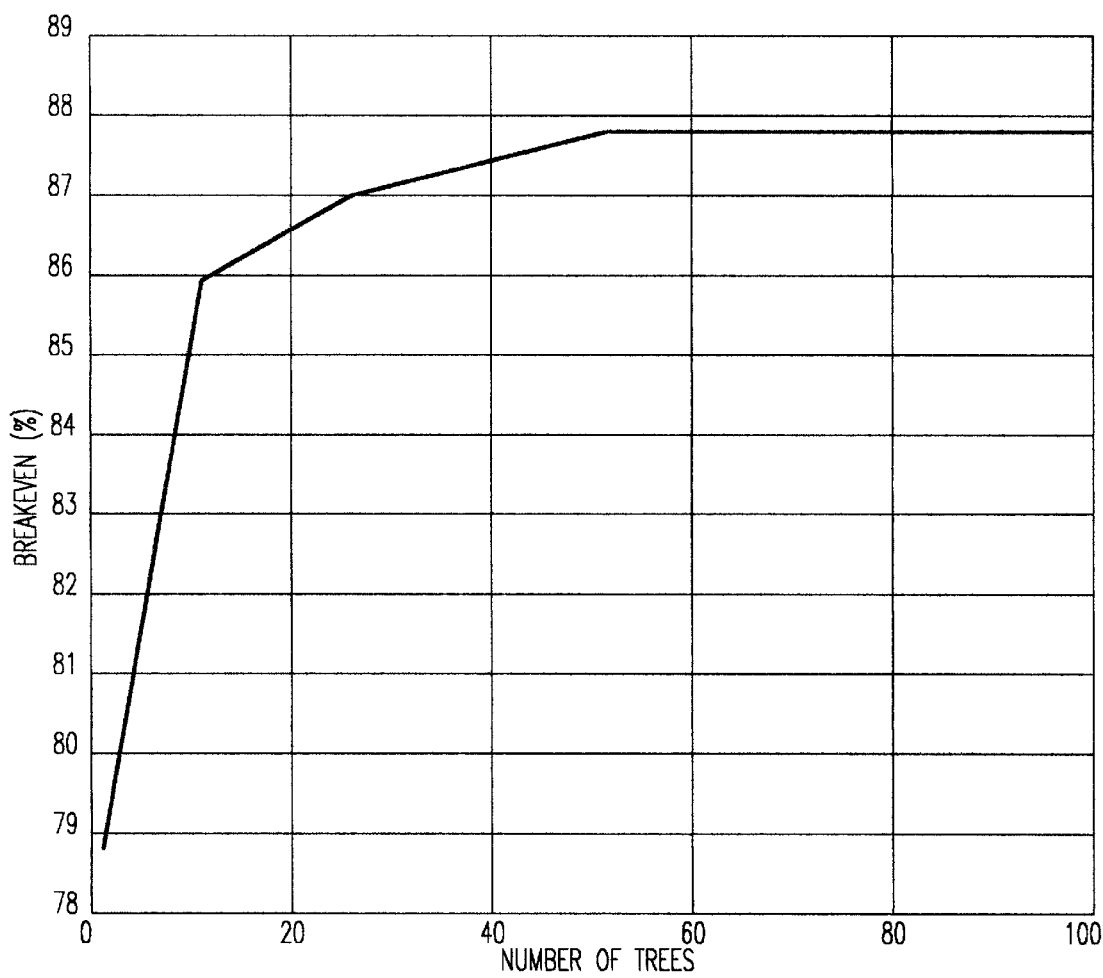
FIG. 12 is a graph illustrating the improved performance obtained with increasing numbers of decision trees generated in accordance with the method of the present invention.

FIG. 12 graphically illustrates the improvement in performance of the present invention with increasing numbers of voting trees. As shown, predictive performance increased as the number of trees increased, but that predictive performance was only slightly better with 100 trees than with 50 trees. A performance plateau is therefore evident from FIG. 12. As also shown, most performance gains were achieved with use of 10 voted trees, which implies a relatively low overhead and complexity.

Figure 13:
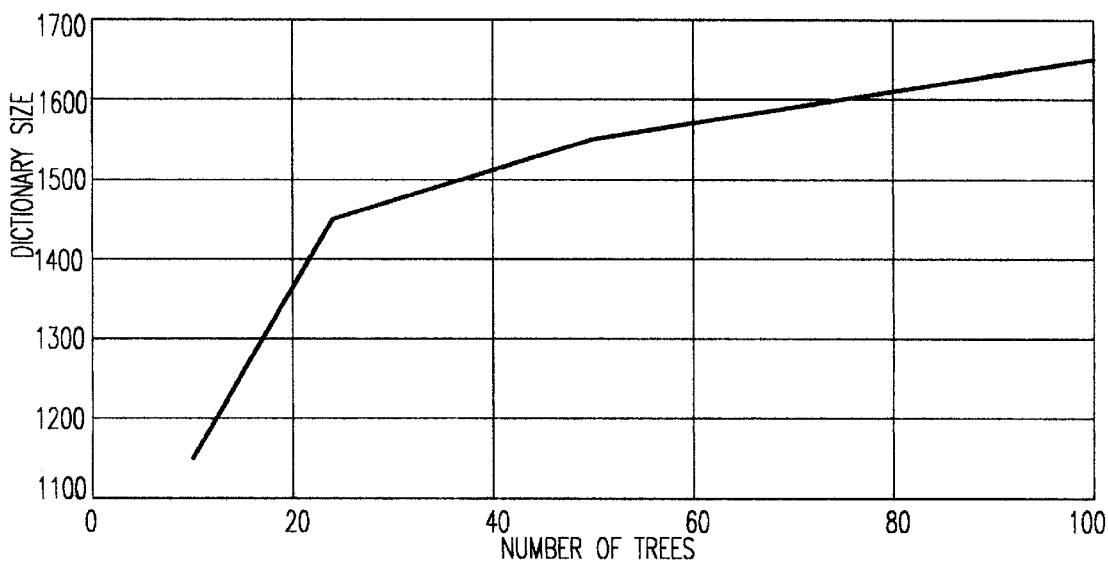
FIG. 13 is a graph illustrating how dictionary size inreases with an increase in number of trees.

The results obtained by using adaptive resampling techniques to generate decision trees in accordance with the present invention demonstrated a performance advantage over conventional methods. The results produced were highly scalable, with the best performance found when ten trees per topic were induced. FIG. 13 illustrates the increase in dictionary size as the number of trees were increased.

Previously, the best results from the conventional methods were achieved using universal dictionaries and complex prediction methods. For example, the best reported nearest-neighbor results relies on estimating many local thresholds for concluding a specific topic, a likely unstable approach. In addition, the cost of matching new documents is very high for nearest-neighbor methods. Support vectors employing universal dictionaries require difficult optimizations.

The adaptive resampling techniques performed in accordance with the present invention, further, proved to be very simple to implement because they did not require special estimation or tuning of individual parameters. The decision trees simply were generated and then voted.

Further, the pooled local dictionaries used were sufficient to capture the key words in a dictionary size far less than the universal dictionaries employed by the conventional methods. As a comparative example, in the experiments performed, the present method achieved the results of the conventional methods with a training dictionary of only 2133 words, substantially less than the universal dictionaries used by the conventional methods. Further, the runtime dictionary for application contained fewer than 1200 words for all topics when voted with ten trees.

Two additional experiments were performed with larger dictionaries. In one experiment, the number of words collected for each local dictionary was doubled to 300 and pooled, resulting in a dictionary of 3878 words. In a second experiment, the pooled local dictionary of 2133 words was merged with a universal dictionary of all words within a global frequency of 5 or more. In neither case, did the results improve over the simple 2133 dictionary.

As for the computation requirements of the present method, the results of the Reuters experiments show that the average tree is quite small, having approximately 16 terminal nodes. Most of the topics had relatively small trees, corresponding to low prevalence of many topics. Since the trees used were binary, the approximate number of logical comparisons is Log 2 of the number of terminal nodes. This suggests that the number of logical comparisons is negligible, even for 50 trees per topic, which is much more modest than even a conventional linear classifier using a full universal dictionary.

Finally, it is noted that an implicit advantage of the present invention of using voted trees is the relative ease with which precision and recall can be traded off. For comparison purposes, an artificial breakeven point standard is employed. However, for voted trees, it is trivial just to adjust these tradeoffs simply by varying the number of votes needed to win.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention. For example, the method of the present invention may be adapted to classify information in the fields of statistics and machine learning, as well as information storage and retrieval.

What is claimed is:

1. A text categorization method comprising:

obtaining a collection of electronic documents;

defining a sample set of documents from the collection;

classifying the documents in the sample set in accordance with steps which include:
(a) analyzing words in the documents of the sample set to identify a plurality of topics,
(b) developing a plurality of local dictionaries, each containing words descriptive of a respective one of said plurality of topics, and
(c) developing vectors for each of the documents in the sample set, with the vectors developed for each document in the sample set being indicative of words in a respective one of said plurality of local dictionaries developed for a respective one of said plurality of topics;

forming a prediction model based on the classification of the documents in the sample set performed in said classifying step, said forming step including:
(d) forming a plurality of decision trees for said plurality of topics, respectively, said decision trees each being formed based on the vectors developed for the documents in said sample for a respective one of said plurality of topics;

classifying a new document based on the prediction model, wherein the step of classifing the documents in the sample set includes combining said plurality of local dictionaries into a single pooled dictionary, said single pooled dictionary containing sorted words with duplicate words removed, and wherein the step of classifying a new document based on the prediction model includes:

identifying words in the new document which correspond to words in said single pooled dictionary;

forming said words into groups belonging to respective ones of said plurality of topics;

applying said plurality of decision trees to said groups to derive classification outcomes, each of said classification outcomes being generated by applying one of said plurality of decision trees to a respective one of said groups relative to one of said plurality of topics; and classifying the new document into at least one of said plurality of topics based on said classification outcomes.

2. The method of claim 1, wherein the new document is classified as corresponding to at least one of said plurality of topics based on one or more of said classification outcomes indicating an affirmative response.

3. The method of claim 2, wherein, for multiple-topic assignment, said plurality of decision trees are binary classifiers, and wherein a classification outcome indicating an affirmative response is one corresponding to a result of "topic," and a classification outcome indicating a negative response is one corresponding to a result of "not-the-topic."

4. A text categorization method comprising:

obtaining a collection of electronic documents;

defining a sample set of documents from the collection;

classifying the documents in the sample set in accordance with steps which include:
(a) analyzing words in the documents of the sample set to identify a plurality of topics,
(b) developing a plurality of local dictionaries, each containing words descriptive of a respective one of said plurality of topics, and
(c) developing vectors for each of the documents in the sample set, with the vectors developed for each document in the sample set being indicative of words in a respective one of said plurality of local dictionaries developed for a respective one of said plurality of topics;

forming a prediction model based on the classification of the documents in the sample set performed in said classifying step, said forming step including:
(d) forming a plurality of decision trees for said plurality of topics, respectively, said decision trees each being formed based on the vectors developed for the documents in said sample for a respective one of said plurality of topics;

classifying a new document based on the prediction model, wherein the step of classifying the documents in the sample set includes combining said plurality of local dictionaries into a single pooled dictionary, said single pooled dictionary containing sorted words with duplicate words removed, and wherein said step of forming a plurality of decision trees is performed in accordance with an adaptive resampling technique which includes, for respective ones of said plurality of topics, the following steps:
(e) forming a first decision tree for a given topic based on each of the vectors developed for documents in a first subset of said sample set which correspond to the given topic;
(f) testing accuracy of said first decision tree by using said first decision tree to classify documents in said sample set;
(g) identifying, based on said testing step, documents in said first subset that were erroneously classified by said first decision tree; and
(h) forming a second decision tree for the given topic based on each of the vectors developed for documents in a second subset of said sample set which correspond to the given topic, said second decision tree being developed so as to properly classify the documents erroneously classified by said first decision tree.

5. The method of claim 4, wherein said step of forming a plurality of decision trees further comprises:

performing steps (e) through (h) to analogously develop third through N decision trees for the given topic based on the vectors developed for documents in respective additional subsets of said sample set which correspond to the given topic, each of said third through N decision trees being developed so as to properly classify documents erroneously classified by a preceding decision tree.

6. The method of claim 5, wherein N=10.

7. The method of claim 5, wherein N lies in a range between 3 and 100, inclusive.

8. The method of claim 5, wherein the step of classifying a new document based on the prediction model includes:

identifying words in the new document which correspond to words in said single pooled dictionary;

forming said words into sets of words belonging to respective ones of said plurality of pre-selected topics;

applying said plurality of decision trees to respective ones of said sets relative to said plurality of pre-selected topics, said applying step including applying the first through N decision trees generated for each topic to a respective one of said sets, the first through N decision trees for each topic generating first through N classification outcomes which are then voted to determine a final classification outcome; and classifying the new document into at least one of said plurality of pre-selected topics based on the final classification outcomes generated in said applying step.

9. The method of claim 5, wherein said first, second, and additional subsets are derived from a random selection of documents from said sample set.

10. The method of claim 9, wherein said first, second, and additional subsets each contain a same number of documents in said sample set, but not all the documents in said sample set are included in each of said first, second, and additional subsets.

11. The method of claim 10, wherein said first, second, and additional subsets each contain a same number of documents in said sample set by including redundant documents in each of said first, second, and additional subsets.

12. The method of claim 8, wherein said first through N classification outcomes are voted according to a simple majority vote.

13. The method of claim 5, wherein the first through N decision trees may be developed sequentially or simultaneously.

14. A text categorization method comprising:

obtaining a collection of electronic documents;

defining a sample set of documents from the collection;

classifying the documents in the sample set in accordance with steps which include:
   (a) analyzing words in the documents of the sample set to identify a plurality of topics,
   (b) developing a plurality of local dictionaries, each containing words descriptive of a respective one of said plurality of topics, and
   (c) developing vectors for each of the documents in the sample set, with the vectors developed for each document in the sample set being indicative of words in a respective one of said plurality of local dictionaries developed for a respective one of said plurality of topics;

forming a prediction model based on the classification of the documents in the sample set performed in said classifying step, said forming step including:
   (d) forming a plurality of decision trees for said plurality of topics, respectively, said decision trees each being formed based on the vectors developed for the documents in said sample for a respective one of said plurality of topics;

classifying a new document based on the prediction model, wherein said step of forming a plurality of decision trees is performed in accordance with an adaptive resampling technique which includes, for respective ones of said plurality of topics, the following steps:
   forming multiple subsets of documents from said sample set for a given topic;
   forming a group of decision trees each based on a different one of said multiple subsets;
   testing accuracy of said group of decision trees, each decision tree in said group, except a last decision tree in said group, being tested for accuracy before another decision tree in said group is formed, said testing step further including maintaining a cumulative error table in memory, said table storing information indicative of which decision trees from said group erroneously classified documents in respective ones of said subsets, as well as information indicative of the erroneously classified documents themselves, said table being updated with said information after each decision tree in said group is tested for accuracy,
   wherein said step of forming a group of decision trees includes forming each decision tree in said group, except a first decision tree in said group, with an emphasis on properly classifying at least one document in said cumulative error table which has been erroneously classified by one or more previous decision trees in said group.

15. A text categorization method comprising:

obtaining collection of electronic documents;

defining a sample set of documents from the collection;

classifying the documents in the sample set in accordance with steps which include:
   (a) analyzing words in the documents of the sample set to identify a plurality of topics,
   (b) developing a plurality of local dictionaries, each containing words descriptive of a respective one of said plurality of topics, and
   (c) developing vectors for each of the documents in the sample set, with the vectors developed for each document in the sample set being indicative of words in a respective one of said plurality of local dictionaries developed for a respective one of said plurality of topics;

forming a prediction model based on the classification of the documents in the sample set performed in said classifying step, said forming step including:
   (d) forming a multi-class decision tree based on the vectors developed for the documents in said sample for said plurality of topics;

classifying a new document based on the prediction model.

wherein the step of classifying the documents in the sample set includes:
   combining said plurality oflocal dictionaries into a single pooled dictionary, said single pooled dictionary containing sorted words with duplicate words removed, wherein the step of classifying a new document based on the prediction model, includes:
   identifying words in the new document which correspond to words in said single pooled dictionary;
   forming said words into groups belonging to respective ones of said plurality of topics;
   applying said multi-class decision tree to said groups to derive a classification outcome; and
   classifying the new document into one of said plurality of topics based on said classification outcome.

16. A text categorization method comprising:

obtaining a collection of electronic documents;

defining a sample set of documents from the collection;

classifying the documents in the sample set in accordance with steps which include:
   (a) analyzing words in the documents ofthe sample set to identify a plurality of topics,
   (b) developing a plurality of local dictionaries, each containing words descriptive of a respective one of said plurality of topics, and
   (c) developing vectors for each of the documents in the sample set, with the vectors developed for each document in the sample set being indicative of words in a respective one of said plurality of local dictionaries developed for a respective one of said plurality of topics;

forming a prediction model based on the classification of the documents in the sample set performed in said classifying step, said forming step including:
(d) forming a plurality of decision trees for said plurality of topics, respectively, said decision trees each being formed based on the vectors developed for the documents in said sample for a respective one of said plurality of topics;

classifying a new document based on the prediction model, wherein the step of classifying a new document based on the prediction model includes:
identifying words in the new document which correspond to words in said plurality of local dictionaries;
forming said words into groups belonging to respective ones of said plurality of topics;
applying said plurality of decision trees to said groups to derive classification outcomes each of said classification outcomes being generated by applying one of said plurality of decision trees to a respective one of said groups relative to one of said plurality of topics; and
classifying the new document into at least one of said plurality of topics based on said classification outcomes,
wherein the step of classifying the documents in the sample set includes combining said plurality of local dictionaries into a single pooled dictionary, said single pooled dictionary containing sorted words with duplicate words removed, and
wherein said step of identifying words in the new document includes identifying words which correspond to words in said single pooled dictionary.

17. A text categorization method comprising:
obtaining a collection of electronic documents;
defining a sample set of documents from the collection;
classifying the documents in the sample set in accordance with steps which include:
(a) analyzing words in the documents of the sample set to identify a plurality of topics,
(b) developing a plurality of local dictionaries, each containing words descriptive of a respective one of said plurality of topics, and
(c) developing vectors for each of the documents in the sample set, with the vectors developed for each document in the sample set being indicative of words in a respective one of said plurality of local dictionaries developed for a respective one of said plurality of topics;

forming a prediction model based on the classification of the documents in the sample set performed in said classifying step, said forming step including;
(d) forming a multi-class decision tree based on the vectors developed for the documents in said sample for said plurality of topics;

classifying a new documnet based on the prediction model, wherein the step of classifying a new document based on the prediction model includes:
identifying words in the new document which correspond to words in said plurality of local dictionaries;
forming said words into groups belonging to respective ones of said plurality of topics;
applying said multi-class desistion tree to said groups to derive a classification outcome; and
classifying the new document into one of said plurality of topics based on said classification outcome,
wherein the step of classifying the documents in the sample set includes combining said plurality of local dictionaries into a single pooled dictionary, said single pooled dictionary containing sorted words with duplicate words removed, and
wherein said step of identifying words in the new document includes identifying words which correspond to words in said single pooled dictionary.

18. A text categorization method comprising:
obtaining a collection of electronic documents;
defining a sample set of documents from the collection;
classifying the documents in the sample set in accordance with steps that include:
(a) analyzing words in the documents of the sample set to identify a plurality of topics,
(b) developing a plurality of local dictionaries, each containing words descriptive of a respective one of said plurality of topics, and
(c) developing vectors for each of the documents in the sample set, with the vectors developed for each document in the sample set being indicative of words in a respective one of said plurality of local dictionaries developed for a respective one of said plurality of topics;

forming a prediction model based on the classification of the documents in the sample set performed in said classifying step, said forming step including:
(d) forming a plurality of decision tries for said plurality of topics, respectively, said decision tries each being formed based on the vectors developed for the documents in said sample for a respective one of said plurality of topics; and classifing a new document based on the prediction model,
wherein the step of classifying the documents in the sample set includes:
combining said plurality of local dictionaries into a single pooled dictionary, said single pooled dictionary containing sorted words with duplicate words removed.

* * * * *